United States Patent
Ko et al.

(10) Patent No.: US 8,224,352 B2
(45) Date of Patent: Jul. 17, 2012

(54) METHOD AND SYSTEM FOR PROVIDING LOCAL PRIVATE BROADCASTING SERVICE WITH A MOBILE TERMINAL

(75) Inventors: Ilju Ko, Seoul (KR); Bokyung Sung, Seoul (KR)

(73) Assignee: Soongsil University Industry & Academy Collaboration Foundation, Seoul (KR)

( * ) Notice: Subject to any disclaimer, the term of this patent is extended or adjusted under 35 U.S.C. 154(b) by 790 days.

(21) Appl. No.: 12/025,988

(22) Filed: Feb. 5, 2008

(65) Prior Publication Data
US 2009/0197618 A1    Aug. 6, 2009

(51) Int. Cl.
*H04W 68/00* (2009.01)

(52) U.S. Cl. ............... 455/456.3; 455/414.1; 455/456.2; 455/456.5; 455/456.6; 455/466; 707/631

(58) Field of Classification Search ............... 455/414.1, 455/456.2, 456.3, 456.5, 456.6; 707/631
See application file for complete search history.

(56) References Cited

U.S. PATENT DOCUMENTS

| | | | |
|---|---|---|---|
| 7,792,756 B2* | 9/2010 | Plastina et al. ................. 705/51 |
| 2003/0069921 A1* | 4/2003 | Lamming et al. .............. 709/203 |
| 2003/0103607 A1* | 6/2003 | Feakes ......................... 379/88.17 |
| 2003/0120940 A1* | 6/2003 | Vataja ............................ 713/193 |
| 2004/0043770 A1* | 3/2004 | Amit et al. ..................... 455/450 |
| 2004/0137921 A1* | 7/2004 | Valloppillil et al. ........... 455/466 |
| 2005/0113066 A1* | 5/2005 | Hamberg ....................... 455/411 |
| 2005/0165784 A1* | 7/2005 | Gomez et al. .................... 707/9 |
| 2006/0294205 A1* | 12/2006 | Aaltonen et al. .............. 709/219 |
| 2007/0082608 A1* | 4/2007 | Nam ............................ 455/3.06 |
| 2007/0197264 A1* | 8/2007 | Itsukaichi ................... 455/569.2 |
| 2008/0172274 A1* | 7/2008 | Hurowitz et al. ................ 705/8 |
| 2008/0188209 A1* | 8/2008 | Dorogusker et al. ...... 455/414.2 |
| 2008/0244010 A1* | 10/2008 | Singh ............................ 709/206 |
| 2009/0019502 A1* | 1/2009 | Liu et al. ...................... 725/109 |

* cited by examiner

*Primary Examiner* — Jinsong Hu
*Assistant Examiner* — Qun Shen
(74) *Attorney, Agent, or Firm* — Kile Park Goekjian Reed & McManus PLLC (57) ABSTRACT

The present invention relates to a method and a system for providing a local private broadcasting service with a mobile terminal. The system for providing a local private broadcasting service with the mobile terminal according to the present invention comprises a broadcasting mobile terminal; a viewing mobile terminal; and a broadcasting relay device which relays a broadcasting content to be streamed down in real time from the broadcasting mobile terminal to the viewing mobile terminal placed in a predetermined broadcasting service area centering on a position of the broadcasting mobile terminal based on a movement of the broadcasting mobile terminal. Thus, the present invention provides a method and a system for providing a local private, broadcasting service through which a mobile terminal user performs a private broadcasting and which has a limited, predetermined broadcasting transmission area based on a position of a broadcasting mobile terminal.

6 Claims, 4 Drawing Sheets

METHOD AND SYSTEM FOR PROVIDING LOCAL PRIVATE BROADCASTING SERVICE WITH A MOBILE TERMINAL

BACKGROUND OF THE INVENTION

1. Field of the Invention

Apparatuses and methods consistent with the present invention relate to a broadcasting service with a mobile terminal, and more particularly, to a method and a system for providing a local private broadcasting service based on a position of a mobile terminal.

2. Description of the Related Art

With the recent advancement in mobile telecommunication technology, a mobile terminal such as a mobile phone and a PDA has become a necessity for modern people and will be increasingly used.

While the mobile terminal had simply been used to make and receive calls, it provides various additional services other than the call function these days. The additional services may include e.g. wireless Internet service, short text message service, position information service, etc. Here, the wireless Internet service has brought various additional services such as multimedia message service, broadcasting service, video phone service in accordance with developing technologies.

The broadcasting service may include digital multimedia broadcasting service and broadcast/multicast service. Such a service is provided by a broadcasting provider and one-way service which is transmitted in real time.

With the advances in the information and telecommunication field such as the Internet, digital cameras and mobile terminals, not only specialists but also ordinary people are producing useful information faster than the existing media do. Such a trend reflects personalized and diverse content instead of a standardized content or service. UCC (user created content) can be an example of the changed trend. That is, people would like to create multimedia content of their own and share it with others, and the UCC has come out of such desires. The UCC is widely spread to personal blogs, home pages or Internet broadcasting in accordance with the developments in Internet technologies.

To this end, it is required to provide a new service adapting people's desires to mobile communication technologies, i.e. to provide a new private broadcasting service for broadcasting their own content, i.e. UCC with a mobile terminal. However, if such a private broadcasting service is realized, there will be too many broadcasters and relay and management of the broadcasting may be difficult. Also, viewers may feel difficult in choosing a desired broadcasting. Meanwhile, it is required to provide two-way broadcasting service, getting out of a conventional one-way broadcasting service.

SUMMARY OF THE INVENTION

Accordingly, it is an aspect of the present invention to provide a method and a system for providing a local private broadcasting service through which a mobile terminal user performs a private broadcasting and which has a predetermined, limited broadcasting transmission area based on a position of a broadcasting mobile terminal.

Also, it is another aspect of the present invention to provide a method and a system for providing a local private broadcasting service through which not only a broadcasting mobile terminal user but also a viewing mobile terminal user transmits his/her content to the broadcasting mobile terminal user and realizes a two-way communication.

Additional aspects and/or advantages of the present invention will be set forth in part in the description which follows and, in part, will be obvious from the description, or may be learned by practice of the present invention.

The foregoing and/or other aspects of the present invention can be achieved by providing a system for providing a local private broadcasting service with a mobile terminal, comprising a broadcasting mobile terminal; a viewing mobile terminal; and a broadcasting relay device which relays a broadcasting content to be streamed down in real time from the broadcasting mobile terminal to the viewing mobile terminal placed in a predetermined broadcasting service area centering on a position of the broadcasting mobile terminal, based on a movement of the broadcasting mobile terminal.

According to an aspect of the invention, the predetermined broadcasting service area comprises at least one of an area having a cell in which the broadcasting mobile terminal is placed and neighboring cells of the cell, an area having a cell in which the broadcasting mobile terminal is placed, neighboring cells of the cell and another neighboring cells of the neighboring cells and an area having an administrative district in which the broadcasting mobile terminal is placed and neighboring administrative districts of the administrative district.

According to an aspect of the invention, the broadcasting content comprises at least one of a multimedia content pre-stored in the broadcasting mobile terminal, identification information of a multimedia content pre-stored in the broadcasting mobile terminal, video data currently captured by the broadcasting mobile terminal and streamed down in real time and/or audio data input through a microphone, voice call data between a user of the broadcasting mobile terminal and others, currently-viewing data of the broadcasting mobile terminal, text data and data combining the foregoing elements.

According to an aspect of the invention, the broadcasting relay device comprises a media server which receives the broadcasting content; a content server which stores therein a database on a content protected by a copyright and authenticates identification information of the received broadcasting content; a streaming server which receives the content from the media server and the content server and streams down in real time the content to the viewing mobile terminal; a WAP (wireless application protocol) page generator which generates a WAP page with broadcasting channel information on the broadcasting mobile terminal by the predetermined broadcasting service area; and a relay controller which controls to update the broadcasting channel information and the WAP page according to a movement of the broadcasting mobile terminal, and controls to stream down the broadcasting content from the broadcasting mobile terminal to the viewing mobile terminal placed in the predetermined broadcasting service area centering on a position of the broadcasting mobile terminal.

According to an aspect of the invention, the relay controller controls to stream down in real time the content from the viewing mobile terminal to the broadcasting mobile terminal.

The foregoing and/or other aspects of the present invention can be achieved by providing a method for providing a local private broadcasting service with a mobile terminal, the method comprising: receiving a request from a broadcasting mobile terminal to broadcast; generating a WAP page by adding information on the broadcasting mobile terminal to private broadcasting channel information of a predetermined broadcasting service area centering on a position of the broadcasting mobile terminal and updating the private broadcasting channel and the WAP page according to a movement of the broadcasting mobile terminal; receiving a request from a viewing mobile terminal to transmit private broadcasting channel information; transmitting a WAP page about the private broadcasting channel information available in the current position of the viewing mobile terminal, to the viewing mobile terminal; receiving a viewing channel selection from the viewing mobile terminal; streaming down in real time a broadcasting content from the broadcasting mobile terminal corresponding to the viewing channel selection to the viewing mobile terminal; and displaying a predetermined message on the viewing mobile terminal if the broadcasting mobile terminal and/or the viewing mobile terminal move and if the viewing mobile terminal is out of the broadcasting service area of the broadcasting mobile terminal.

According to an aspect of the invention, the predetermined broadcasting service area comprises at least one of an area having a cell in which the broadcasting mobile terminal is placed and neighboring cells of the cell, an area having a cell in which the broadcasting mobile terminal is placed, neighboring cells of the cell and another neighboring cells of the neighboring cells and an area having an administrative district in which the broadcasting mobile terminal is placed and neighboring administrative districts of the administrative district.

According to an aspect of the invention, the broadcasting content comprises at least one of a multimedia content pre-stored in the broadcasting mobile terminal, identification information of a multimedia content pre-stored in the broadcasting mobile terminal, video data currently captured by the broadcasting mobile terminal and streamed down in real time and/or audio data input through a microphone, voice call data between a user of the broadcasting mobile terminal and others, currently-viewing data of the broadcasting mobile terminal, text data and data combining the foregoing elements.

According to an aspect of the invention, the method further comprises providing a database on a content protected by a copyright; and authenticating received identification information if the identification information of the content is received, and the streaming down in real time the content comprises streaming down in real time the authenticated content from the database to the viewing mobile terminal.

According to an aspect of the invention, the method further comprises streaming down in real time a content from the viewing mobile terminal to the broadcasting mobile terminal.

BRIEF DESCRIPTION OF THE DRAWINGS

The above and/or other aspects of the present invention will become apparent and more readily appreciated from the following description of the exemplary embodiments, taken in conjunction with the accompany drawings of which.

DETAILED DESCRIPTION OF EXEMPLARY EMBODIMENTS

Hereinafter, exemplary embodiments of the present invention will be described with reference to accompanying drawings, wherein like numerals refer to like elements and repetitive descriptions will be avoided as necessary.

Figure 1:
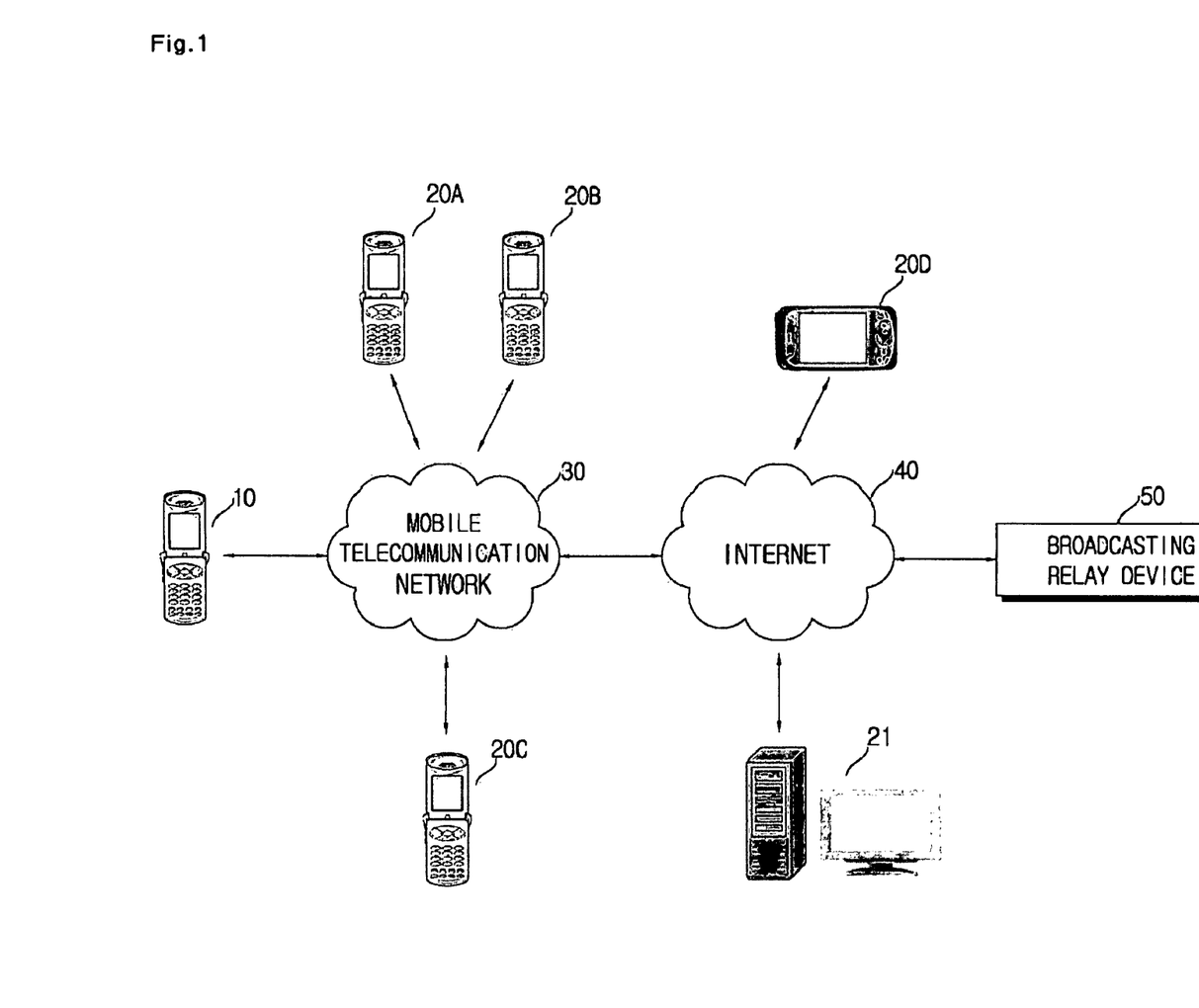
FIG. 1 is a control block diagram of a system for providing a local private broadcasting service with a mobile terminal according to an exemplary embodiment of the present invention.

FIG. 1 is a control block diagram of a system for providing a local private broadcasting service with a mobile terminal according to an exemplary embodiment of the present invention.

As shown therein, a system for providing a local private broadcasting service according to an exemplary embodiment of the present invention includes a broadcasting mobile terminal 10, viewing mobile terminals 20A, 20B and 20C and a broadcasting relay device 50. The broadcasting mobile terminal 10, the viewing mobile terminals 20A, 20B and 20C and the broadcasting relay device 50 are connected to one another through a mobile telecommunication network 30 and the Internet 40 to perform a private broadcasting service.

The broadcasting mobile terminal 10 is provided to perform the private broadcasting. The broadcasting mobile terminal 10 performs the local private broadcasting service according to the present invention as well as a wireless voice call function. The broadcasting mobile terminal 10 includes a module to provide a wireless data service or a wireless Internet service.

More specifically, the broadcasting mobile terminal 10 includes a program to access the local private broadcasting service according to the present invention and transmit its broadcasting content. The broadcasting mobile terminal 10 further includes modules to generate a multimedia content as the broadcasting content and transmit it in real time. For example, the broadcasting mobile terminal 10 may include a media recording device such as a camera and a microphone to record video data and audio data, an MPEG codec and an audio codec to process video data and audio data and a platform to transmit a multimedia content. The broadcasting mobile terminal 10 may include a memory to store therein video data captured by a camera or downloaded from the outside and the audio data. The broadcasting mobile terminal 10 may include a mixer to mix at least two audios, an audio and a music, a video and an audio and a video and a music, a decoder or a software module. The broadcasting mobile terminal 10 may have a listing function to list up a stored content.

The broadcasting content refers to a content transmitted and broadcast by the broadcasting mobile terminal 10. For example, the broadcasting content may include a multimedia content pre-stored in the broadcasting mobile terminal 10, identification information of a multimedia content pre-stored in the broadcasting mobile terminal 10, video data currently captured and streamed down in real time by the broadcasting mobile terminal 10 and/or audio data input through a microphone, voice call data between a user of the broadcasting mobile terminal 10 and others, currently-viewing data of the broadcasting mobile terminal 10, text data, and data combining the foregoing elements.

The multimedia content pre-stored in the broadcasting mobile terminal 10 refers to video data and audio data which are stored in the broadcasting mobile terminal 10 prior to broadcasting. For example, the multimedia content may include pictures or videos captured by a camera embedded in the broadcasting mobile terminal 10. A broadcasting mobile terminal user may transmit the multimedia content as a file, or play and stream it.

Figure 3:
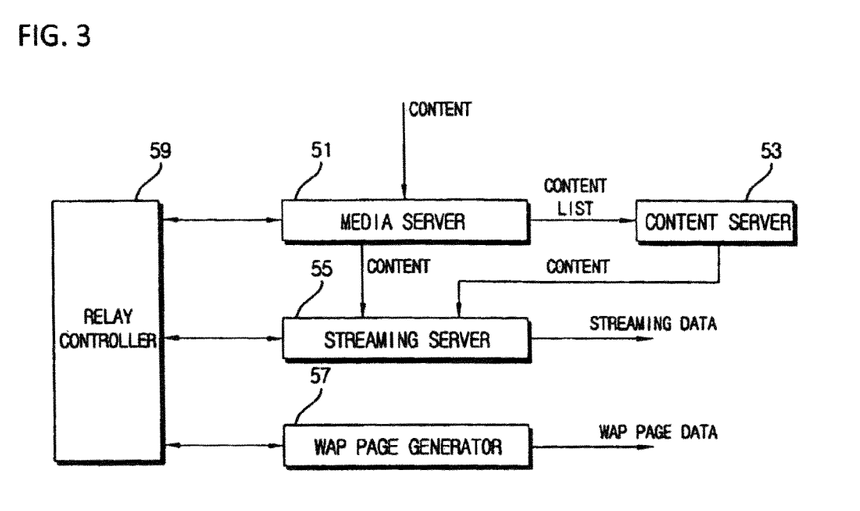
FIG. 3 is a control block diagram of a broadcasting relay device of the system for providing the local private broadcasting service with the mobile terminal according to the exemplary embodiment of the present invention.

The identification information of the pre-stored multimedia content includes identification information of a multimedia content paid for and downloaded from a content server 53 prior to broadcasting. The identification information of the pre-stored multimedia content may refer to a part or all of meta data including author information. That is, as a user has already paid for royalties on the downloaded content, he/she may receive identification information first to play and view the concerned content stored in the content server 53. If a user should additionally pay for royalties on performing a private broadcasting with the downloaded content, he/she may receive a message and be guided to pay for the royalties.

The video data currently captured and streamed in real time by the broadcasting mobile terminal 10 and/or the audio data input through the microphone refer to video data captured in real time and transmitted by the broadcasting mobile terminal 10 during broadcasting and the audio data. The voice call data between a user of the broadcasting mobile terminal 10 and others refers to call content (including a call between at least two people) if a broadcasting mobile terminal user makes and receives calls with viewing mobile terminal users. The voice call data can also be a broadcasting content. The currently-viewing data of the broadcasting mobile terminal 10 refers to a screen currently displayed on a display window of the broadcasting mobile terminal 10. The text data such as Short Message Service can also be a broadcasting content.

Also, data combining the foregoing elements can be a broadcasting content. For example, a music currently played by the broadcasting mobile terminal 10 and an audio input through a microphone may be mixed to be broadcast, or the music may be mixed with the currently-captured video to be broadcast. The mixing process may be performed by the broadcasting mobile terminal 10 or by the broadcasting relay device 50, but usually by the broadcasting relay device 50. Meanwhile, an audio is transmitted in real time after the identification information of the pre-stored content is transmitted. Then, the broadcasting relay device 50 mixes the identification information and the audio to be transmitted to the viewing mobile terminals 20A, 20B and 20C.

For example, if a broadcasting mobile terminal user selects one of stored contents from the stored content list to be broadcast (if selecting a plurality of content, a user may select a broadcasting order, too), the selected content is played by the broadcasting mobile terminal 10 and transmitted to the broadcasting relay device 50 together with the audio to be broadcast, transmitted as a file and mixed with a voice of the broadcasting mobile terminal user to be broadcast by the broadcasting relay device 50 or the identification information of the content is transmitted to the broadcasting relay device 50 to be authenticated, mixed and broadcast.

The combination of the foregoing broadcasting content may vary.

The viewing mobile terminals 20A, 20B and 20C are terminals to view a private broadcasting. Users of the viewing mobile terminals 20A, 20B and 20C may access the local private broadcasting service according to the present invention to receive and view a broadcasting content. The viewing mobile terminals 20A, 20B and 20C include modules to receive a broadcasting content in real time, and the required specification is similar to that of the broadcasting mobile terminal 10. Thus, detailed descriptions will be omitted.

The viewing mobile terminals 20A, 20B and 20B may transmit a content to the broadcasting mobile terminal 10 while displaying the broadcasting. For example, viewing mobile terminal users may transmit stored audios or videos including text messages and multimedia messages to a broadcasting mobile terminal user. Here, a telephone number of a broadcasting mobile terminal user is closed, and may be disclosed if he/she sets to disclose the phone number.

The broadcasting relay device 50 according to the exemplary embodiment of the present invention relays a private broadcasting service between the broadcasting mobile terminal 10 and the viewing mobile terminals 20A, 20B and 20C. With the broadcasting mobile terminal 10 moving, the broadcasting relay device 50 allows the broadcasting mobile terminal 10 to transmit a private broadcasting to a local area (hereinafter, to be called broadcasting service area) centering on a current cell (or base station) in which the broadcasting mobile terminal 10 is placed. As the broadcasting mobile terminal 10 moves, the broadcasting service area in which the private broadcasting of the broadcasting mobile terminal 10 is available changes.

The broadcasting service area may include an area having the cell in which the broadcasting mobile terminal 10 is placed and neighboring cells of the cell, an area having the cell in which the broadcasting mobile terminal 10 is placed, the neighboring cells of the cell and another neighboring cells of the neighboring cells, and an area having an administrative district in which the broadcasting mobile terminal 10 is placed and neighboring administrative districts of the administrative district.

Figure 2:
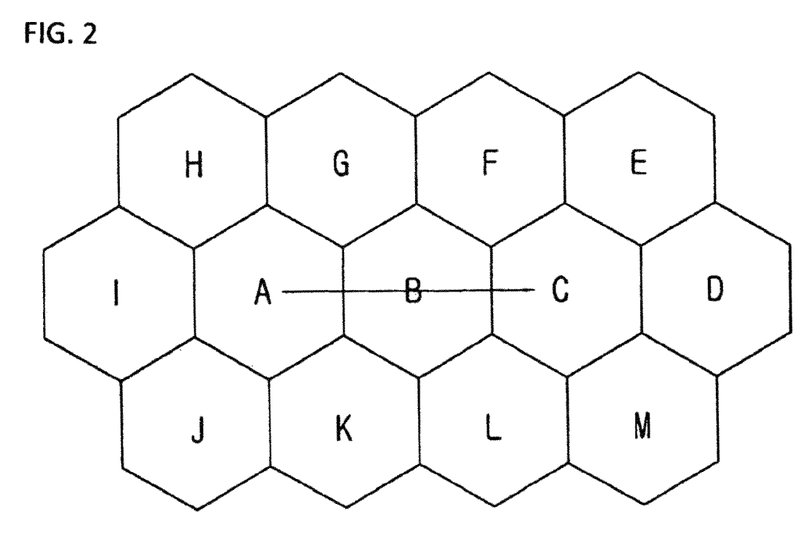
FIG. 2 illustrates an example of a broadcasting service area centering on a position of a broadcasting mobile terminal according to the exemplary embodiment of the present invention.

The broadcasting service area will be described with reference to FIG. 2. FIG. 2 illustrates the mobile telecommunication network 30 including cells. The broadcasting service area includes an area having neighboring cells centering on a cell (base station) in which the broadcasting mobile terminal 10 is placed (example 1). For example, if the broadcasting mobile terminal 10 is placed in a cell A, the broadcasting service area includes the cell A and neighboring cells B, G, H, I, J and K, i.e. the area having the cells A, B, G, H, I, J and K.

If the broadcasting mobile terminal 10 moves from the cell A to the cell B, the broadcasting service area includes an area having the cells B, C, F, G, A, K and L. If the broadcasting mobile terminal 10 moves from the cell B to the cell C, the broadcasting service area includes an area having the cells C, D, E, F, B, L and M. As described above, as the broadcasting mobile terminal 10 moves from the cell B to the cell B to the cell C, the broadcasting service area changes from the cells A, B, G, H, I, J and K to the cells B, C, F, G, A, K and L to the cells C, D, E, F, B, L and M. When the broadcasting mobile terminal 10 moves from the cell A to the cell B, the cells H, I and J are excluded, the cells F, C and L are added and the cells B, G and K are still included in the broadcasting service area.

As the broadcasting service area includes neighboring cells centering on the cell (base station) in which the broadcasting mobile terminal 10 is placed, a user may still view the private broadcasting of the broadcasting mobile terminal 10 in a certain neighboring area even if the broadcasting mobile terminal 10 moves. The viewing mobile terminals 20A, 20B and 20C which move together with the broadcasting mobile terminal 10 within a two-cell distance may continuously display the private broadcasting of the broadcasting mobile terminal 10.

Meanwhile, the broadcasting service area may include neighboring cells of the cell (base station) in which the broadcasting mobile terminal 10 is placed, and another neighboring cells of the neighboring cells (example 2). For example, if the broadcasting mobile terminal 10 is placed in the cell B, the broadcasting service area includes all cells in FIG. 2, and even other cells (not shown).

As described above, the broadcasting service area may include an area having an administrative district in which the broadcasting mobile terminal 10 is placed and neighboring administrative districts of the administrative district (example 3). The administrative district may refer to district, city or province.

As described above, the broadcasting transmission area (broadcasting service area) is limited so that the private broadcasting is performed within the current mobile telecommunication network 30 as the currently-used mobile telecommunication network 30 is a cell-based mobile telecommunication network. Also, as mobile terminals usually have a small display window, the mobile terminals have their limitation in displaying much information at a time. That is, the number of broadcasters (the number of broadcasting channels) is controlled by limiting the broadcasting transmission area. Thus, users of the viewing mobile terminals 20A, 20B and 20C may view a desired broadcasting without difficulty. If the broadcasting transmission area is not limited, too many channels exist causing a lot of management expenses. Thus, the broadcasting transmission area is limited and the private broadcasting can be realized without large expenses.

Meanwhile, users of the broadcasting mobile terminal 10 or of the viewing mobile terminals 20A, 20B and 20C may select the broadcasting service area. That is, a user may directly select a desired broadcasting service area among various broadcasting service areas. In some cases, a service provider (e.g. a manager of the broadcasting relay device 50) may select the broadcasting service area according to popularity. For example, if the broadcasting is popular, the service provider may extend the broadcasting service area.

As shown in FIG. 1, the private broadcasting service provides the private broadcasting to not only a mobile terminal through the mobile telecommunication network 30 but also a mobile terminal 20D (e.g. PDA and PMP) connected to the Internet 40 or to a desktop computer 21. If the mobile terminal is connected to the Internet 40, a user may select and view overall private broadcastings regardless of the broadcasting service area. An additional web page may be generated and displayed to provide channel information to users of the mobile terminals connected to the Internet 40.

More detailed operations of the broadcasting relay device 50 will be described with reference to FIG. 3. FIG. 3 is a control block diagram of the broadcasting relay device 50 of the system for providing the local private broadcasting service with the mobile terminal according to the exemplary embodiment of the present invention. As shown therein, the broadcasting relay device 50 according to the exemplary embodiment of the present invention includes a media server 51, a content server 53, a streaming server 55, a WAP (wireless application protocol) page generator 57 and a relay controller 59.

The media server 51 receives a broadcasting content from the broadcasting mobile terminal 10 through the mobile telecommunication network 30 and the Internet 40. The media server 51 processes the broadcasting content transmitted by the broadcasting mobile terminal 10 to be streamed down to the streamer server 55. If the received broadcasting content includes identification information of the content, the identification information is transmitted to the content server 53.

The content server 53 stores therein a database on various content (music sources, videos, etc.) protected by a copyright. The content server 53 searches the content corresponding to the identification information of the received content from the database, authenticates the content and transmits the authenticated content to the streaming server 55.

For example, if a user of the broadcasting mobile terminal 10 selects one of music from a music content list which is pre-downloaded to the broadcasting mobile terminal 10 and transmits the selected music content to be broadcast, what is transmitted is identification information of the selected music content. The content server 53 searches music corresponding to the identification information, authenticates it and transmits the authenticated music content to the streaming server 55.

The streaming server 55 mixes the broadcasting content transmitted by the media server 51 and the content server 53 and streams down the mixed broadcasting content to the viewing mobile terminals 20A, 20B and 20C.

The Wap page generator 57 generates a WAP page with broadcasting channel information on the broadcasting mobile terminal 10 in the respective broadcasting service areas. The generated WAP page of the respective broadcasting service areas is supplied to the viewing mobile terminals 20A, 20B and 20C. For example, broadcasting channel information of a broadcasting service area centering on the cell A in FIG. 2 may be different from that of a broadcasting service area centering on the cell B. That is, a broadcasting list which is available in the cell A is different from that available in the cell B. Thus, the Wap page generator 57 generates broadcasting channel information on each of the broadcasting service areas and provides a WAP page to the viewing mobile terminals 20A, 20B and 20C placed in the concerned broadcasting service area. The viewing mobile terminals 20A, 20B and 20C receive available channel information through the WAP page and display a broadcasting of a desired channel.

Preferably, the broadcasting channel information generated as the WAP page may be provided to a user to easily distinguish broadcastings and recognize a broadcasting content. For example, the broadcasting channel information may include a broadcaster's name (nick name), a position, a title of a content, etc. The broadcasting channel information may be designated by broadcasters. That is, the broadcasting mobile terminal 10 may transmit a broadcasting title or description to be used as the channel information. Alternatively, the Wap page generator 57 may select a title and description of a currently-broadcast content as channel information.

The relay controller 59 receives information on positions (base station or cell) of the broadcasting mobile terminal 10 and the viewing mobile terminals 20A, 20B and 20C from the mobile telecommunication network 30, and controls the media server 51, the content server 53, the streaming server 55 and the Wap page generator 57 to broadcast in the set broadcasting service area through the broadcasting mobile terminal 10.

More specifically, the relay controller 59 controls to update the broadcasting channel information and the WAP page according to a movement of the broadcasting mobile terminal 10. If the broadcasting mobile terminal 10 moves from one cell to another cell, the broadcasting service area in which the broadcasting mobile terminal 10 is available changes. Thus, the broadcasting channel information and the WAP page are also updated. For example, if the broadcasting mobile terminal 10 moves from the cell A to the cell B, the information on the broadcasting mobile terminal 10 is removed from the broadcasting channel information and the WAP page of some cells (H, I and J) in the broadcasting service area centering on the cell A, and added to the broadcasting channel information and the WAP page of some cells (F, C and L) in the broadcasting service area centering on the cell B. Remaining cells maintain the broadcasting channel information of the broadcasting mobile terminal 10. If the viewing mobile terminals 20A, 20B and 20C are placed in the cell G, a user may view a broadcasting of the broadcasting mobile terminal 10 even if the broadcasting mobile terminal 10 moves.

The relay controller 59 controls a broadcasting content received from the broadcasting mobile terminal 10 to be streamed down in real time to the viewing mobile terminals 20A, 20B and 20C which are placed in the broadcasting service area centering on the position of the broadcasting mobile terminal 10.

As described above, the relay controller 59 receives information on the position of the mobile terminals from the mobile telecommunication network 30 and manages the broadcasting transmission area (i.e. broadcasting service area).

The mobile telecommunication network 30 is used to provide voice call service, wireless data service and wireless Internet service between the broadcasting mobile terminal 10 and the viewing mobile terminals 20A, 20B and 20C. Generally, the mobile telecommunication network 30 includes a wireless base station, a mobile switching center, a home location register (HLR), a packet data serving node (PDSN), an IP network, a home agent (HA), etc.

The mobile terminals are handed off by a wireless base station of the mobile telecommunication network 30. While moving, data communication is performed by the PDSN and HA.

For example, if the broadcasting mobile terminal 10 and the viewing mobile terminals 20A, 20B and 20C move from one cell to another, they receive a temporary IP address from the PDSN. The temporary IP address refers to a position of the mobile terminals. The PDSN and HA transmit and receive a fixed IP and the temporary IP address of the broadcasting mobile terminal 10 and the viewing mobile terminals 20A, 20B and 20C to track down and manage the position. In conventional data communication, such a technology is used to seamlessly receive data while moving. In the private broadcasting according to the present invention, the technology is used to transmit the broadcasting within only a particular broadcasting service area centering on the position of the broadcasting mobile terminal 10.

For example, the relay controller 59 stops providing the broadcasting service of the broadcasting mobile terminal 10 if the broadcasting mobile terminal 10 and/or the viewing mobile terminals 20A, 20B and 20C move and if the viewing mobile terminals 20A, 20B and 20C are out of the broadcasting service area of the broadcasting mobile terminal 10. Here, the viewing mobile terminals 20A, 20B and 20C may receive new channel information of the broadcasting service area where they are placed. The relay controller 59 receives information on the position of the broadcasting mobile terminal 10 and manages channel information of the broadcasting service area.

The private broadcasting service according to the present invention may provide two-way communication. As described above, users of the viewing mobile terminals 20A, 20B and 20C displaying the broadcasting may transmit their content to the broadcasting mobile terminal 10. The transmittable content is similar to the content of the broadcasting mobile terminal 10. For example, users of the viewing mobile terminals 20A, 20B and 20C may receive and send text messages with a user of the broadcasting mobile terminal 10, and receive and makes calls with an existing call function. Also, users may transmit currently-capturing video data. The content, e.g. text data, voice call data or video data may be broadcast according to user's selection and relayed by the broadcasting relay device 50.

The broadcasting relay device 50 may include the foregoing elements as an additional system or may include a single integrated device.

Figure 4A:
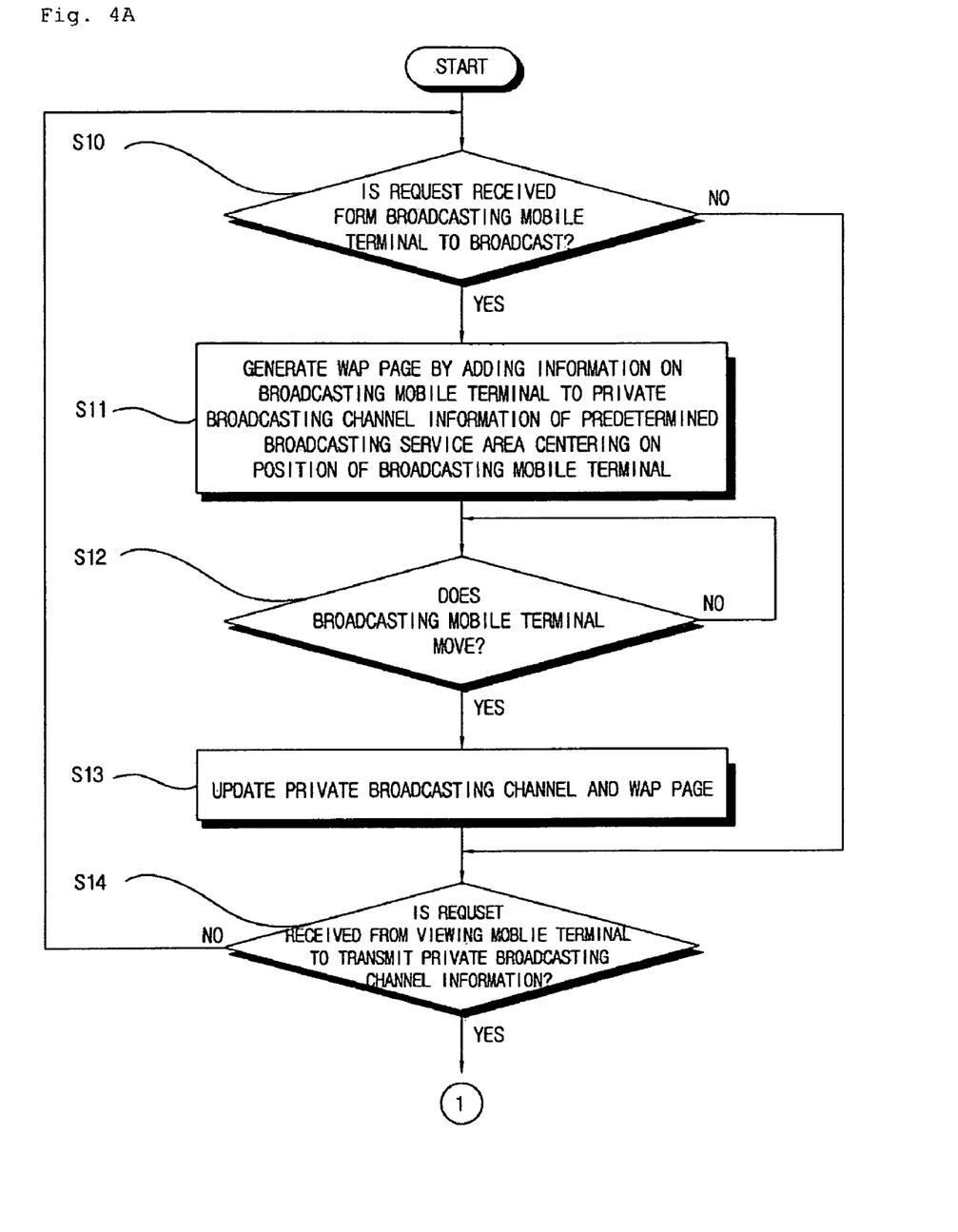
FIGS. 4A and 4B are control flowcharts of the system for providing the local private broadcasting service with the mobile terminal according to the exemplary embodiment of the present invention.
Figure 4B:
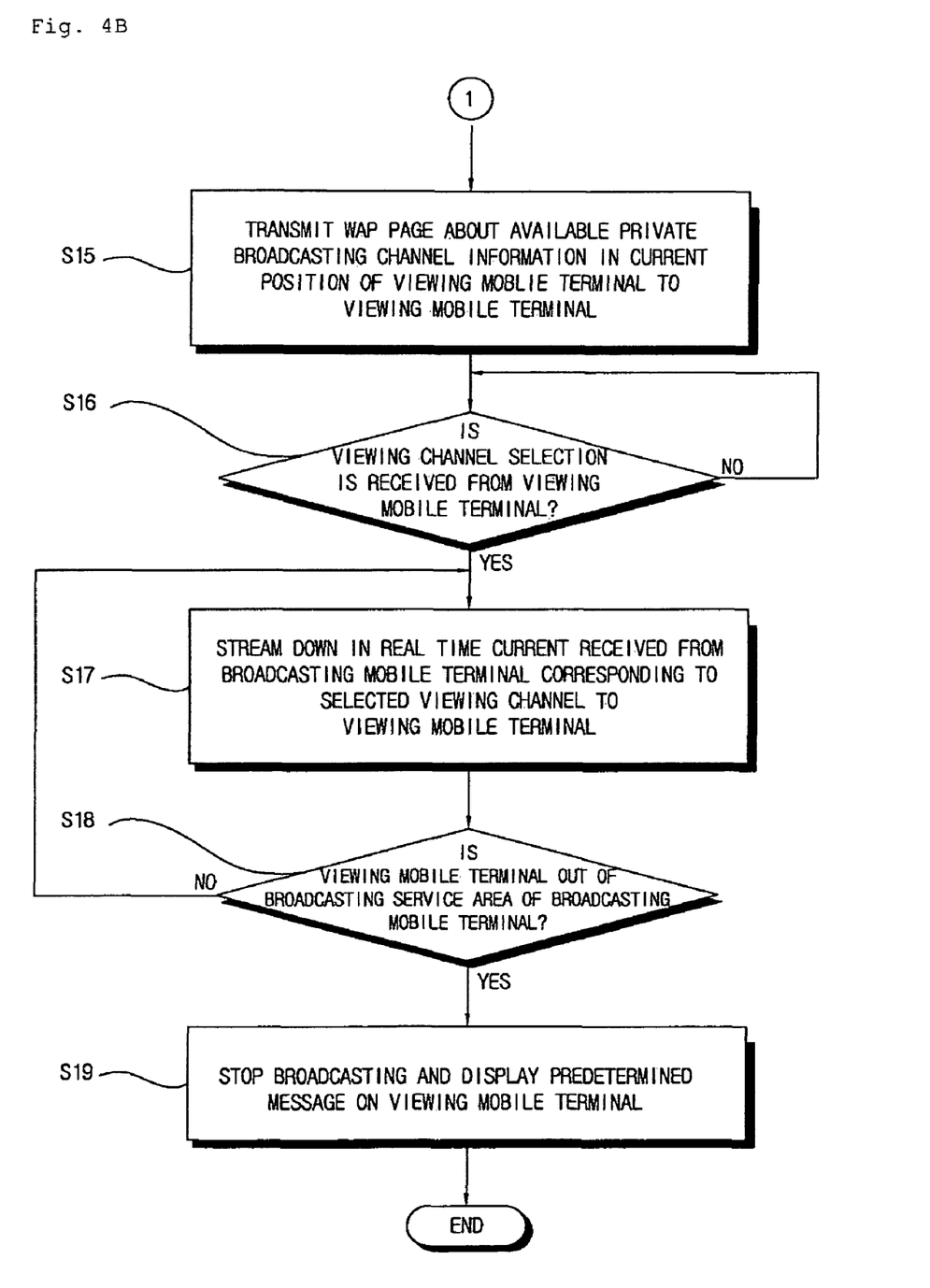

FIGS. 4A and 4B are control flowcharts of the system for providing the local private broadcasting service with the mobile terminal according to the exemplary embodiment of the present invention.

As shown in FIG. 4A, if the broadcasting relay device 50 receives a request from the broadcasting mobile terminal 10 to broadcast (S10), the relay controller 59 adds information on the broadcasting mobile terminal 10 to the private broadcasting channel information of the broadcasting service area centering on the cell where the broadcasting mobile terminal 10 is currently placed, and controls the Wap page generator 57 to generate a WAP page about the broadcasting channel of the broadcasting service area (S11). The broadcasting mobile terminal 10 may access the private broadcasting service and select a "broadcast" function to request broadcasting.

If the broadcasting mobile terminal 10 moves to another cell (S12), the relay controller 59 controls to update the private broadcasting channel information of the broadcasting service areas and the WAP page (S13).

For example, if the broadcasting mobile terminal 10 moves from the cell A to the cell B, the information on the broadcasting mobile terminal 10 is removed from channel information of the broadcasting service area centering on the cells H, I and J, and added to the channel information of the broadcasting service area centering on the cells F, C and L. The information on the broadcasting mobile terminal 10 is maintained in the broadcasting service area centering on the cells A, B, G and K.

If the viewing mobile terminals 20A, 20B and 20C request the private broadcasting channel information (S14), the relay controller 59 supplies the WAP page about the private broadcasting channel information on the broadcasting service area centering on the position of the viewing mobile terminals 20A, 20B and 20C to the viewing mobile terminals 20A, 20B and 20C (S15).

The viewing mobile terminals 20A, 20B and 20C may select a desired broadcasting channel from the WAP page. If receiving the selection on the broadcasting channel from the viewing mobile terminals 20A, 20B and 20C (S16), the relay controller 59 controls the content being received from the broadcasting mobile terminal 10 corresponding to the selected channel, to be streamed down in real time to the viewing mobile terminals 20A, 20B and 20C (S17).

If the broadcasting mobile terminal 10 and/or the viewing mobile terminals 20A, 20B and 20C move and if the viewing mobile terminals 20A, 20B and 20C are out of the broadcasting service area of the broadcasting mobile terminal 10 (S18), the relay controller 59 stops broadcasting provided to the viewing mobile terminals 20A, 20B and 20C and transmits a predetermined message thereto (S19). For example, the viewing mobile terminals 20A, 20B and 20C may receive and display broadcasting channel information which is available on the current position, together with the message informing the get-out. The viewing mobile terminals 20A, 20B and 20C select a desired broadcasting through a WAP page and continuously display the broadcasting.

As described above, the present invention provides a method and a system for providing a local private broadcasting service through which a mobile terminal user performs a private broadcasting.

Although a few exemplary embodiments of the present invention have been shown and described, it will be appreciated by those skilled in the art that changes may be made in these exemplary embodiments without departing from the principles and spirit of the invention, the scope of which is defined in the appended claims and their equivalents.

INDUSTRIAL APPLICABILITY

The present invention provides a method and a system for providing a local private broadcasting service through which a mobile terminal user performs a private broadcasting, and which has a predetermined, limited broadcasting transmission area based on a position of a broadcasting mobile terminal.

Also, the present invention provides a method and a system for providing a local private broadcasting service which provides two-way communication so that not only a broadcasting mobile user, but also viewing mobile terminal users transmit a content to mobile terminal users through a mobile terminal.

What is claimed is:

1. A system for providing a local private broadcasting service with a mobile terminal, the system comprising:
   a broadcasting mobile terminal to broadcast broadcasting content of the broadcasting mobile terminal;
   a viewing mobile terminal which is different from the broadcasting mobile terminal; and
   a broadcasting relay device which relays the broadcasting content to be streamed down in real time from the broadcasting mobile terminal to the viewing mobile terminal placed in a broadcasting service area centering on a position of the broadcasting mobile terminal based on movement of the broadcasting mobile terminal:
   wherein the broadcasting service area comprises at least one of:
      an area having a cell in which the broadcasting mobile terminal is placed and neighboring cells of the cell;
      an area having a cell in which the broadcasting mobile terminal is placed, neighboring cells of the cell and another neighboring cells of the neighboring cells; and
   an area having an administrative district in which the broadcasting mobile terminal is placed and neighboring administrative districts of the administrative district;
   wherein the broadcasting content comprises at least one of a multimedia content pre-stored in the broadcasting mobile terminal, identification information of a multimedia content pre-stored in the broadcasting mobile terminal, video data content including at least one of video data currently captured by the broadcasting mobile terminal and streamed down in real time, audio data input through a microphone, voice call data between a user of the broadcasting mobile terminal and others, currently-viewing data of the broadcasting mobile terminal, text data, and data combining the foregoing elements.

2. The system according to claim 1, wherein the broadcasting relay device comprises a media server which receives the broadcasting content;
   a content server which stores therein a database on a content protected by a copyright and authenticates identification information of the received broadcasting content;
   a streaming server which receives content from the media server and the content server and streams down in real time the content to the viewing mobile terminal;
   a WAP (wireless application protocol) page generator which generates a WAP page with broadcasting channel information on the broadcasting mobile terminal in the broadcasting service area; and
   a relay controller which controls to update the broadcasting channel information and the WAP page according to movement of the broadcasting mobile terminal, and controls to stream down the broadcasting content from the broadcasting mobile terminal to the viewing mobile terminal placed in the broadcasting service area centering on a position of the broadcasting mobile terminal.

3. The system according to claim 2, wherein the relay controller controls to stream down in real time the content from the viewing mobile terminal to the broadcasting mobile terminal.

4. A method for providing a local private broadcasting service with a mobile terminal, the method comprising:
   receiving a request from a broadcasting mobile terminal to broadcast broadcasting content of the broadcasting mobile terminal;
   generating a WAP page by adding information on the broadcasting mobile terminal to private broadcasting channel information of a broadcasting service area centering on a position of the broadcasting mobile terminal and updating the private broadcasting channel information and the WAP page according to movement of the broadcasting mobile terminal;
   receiving a request from a viewing mobile terminal to transmit the private broadcasting channel information, the viewing mobile terminal being different from the broadcasting mobile terminal;
   transmitting a WAP page about the private broadcasting channel information available in the current position of the viewing mobile terminal, to the viewing mobile terminal;
   receiving a viewing channel selection from the viewing mobile terminal;
   streaming down in real time the broadcasting content from the broadcasting mobile terminal corresponding to the viewing channel selection to the viewing mobile terminal; and
   displaying a predetermined message on the viewing mobile terminal if at least one of the broadcasting mobile terminal and the viewing mobile terminal move and if the viewing mobile terminal is out of the broadcasting service area of the broadcasting mobile terminal,
   wherein the broadcasting service area comprises at least one of:
      an area having a cell in which the broadcasting mobile terminal is placed and neighboring cells of the cell;
      an area having a cell in which the broadcasting mobile terminal is placed, neighboring cells of the cell and another neighboring cells of the neighboring cells; and
      an area having an administrative district in which the broadcasting mobile terminal is placed and neighboring administrative districts of the administrative district;
   wherein the broadcasting content comprises at least one of a multimedia content pre-stored in the broadcasting mobile terminal, identification information of a multimedia content pre-stored in the broadcasting mobile terminal, video data content including at least one of video data currently captured by the broadcasting mobile terminal and streamed down in real time:

audio data input through a microphone, voice call data between a user of the broadcasting mobile terminal and others, currently-viewing data of the broadcasting mobile terminal, text data, and data combining the foregoing elements.

5. The method according to claim 4, further comprising: providing a database on a content protected by a copyright; and authenticating the identification information if the identification information of the content is received, wherein the streaming down in real time the content comprises streaming down in real time the authenticated content from the database to the viewing mobile terminal.

6. The method according to claim 5, further comprising streaming down in real time a content from the viewing mobile terminal to the broadcasting mobile terminal.

* * * * *